United States Patent
Hwang et al.

(10) Patent No.: US 9,019,215 B2
(45) Date of Patent: Apr. 28, 2015

(54) DISPLAY WITH INTEGRATED TOUCH SENSOR FOR DETECTING A TOUCH BY MUTUAL CAPACITANCE AND METHOD THEREOF

(75) Inventors: Sangsoo Hwang, Seoul (KR); Cheolse Kim, Daegu (KR); Manhyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 258 days.

(21) Appl. No.: 13/336,085

(22) Filed: Dec. 23, 2011

(65) Prior Publication Data

US 2012/0242597 A1 Sep. 27, 2012

(30) Foreign Application Priority Data

Mar. 25, 2011 (KR) ........................ 10-2011-0026915

(51) Int. Cl.
*G06F 3/041* (2006.01)
*G06F 3/044* (2006.01)
*G09G 3/36* (2006.01)

(52) U.S. Cl.
CPC .............. *G06F 3/044* (2013.01); *G06F 3/0412* (2013.01); *G06F 3/0418* (2013.01); *G09G 3/3648* (2013.01); *G09G 2354/00* (2013.01)

(58) Field of Classification Search
CPC ................................................... G06F 3/0488
USPC ........................................................ 345/173
See application file for complete search history.

(56) References Cited

U.S. PATENT DOCUMENTS

| | | | |
|---|---|---|---|
| 5,532,630 A * | 7/1996 | Waggoner et al. | ............ 327/108 |
| 2004/0227743 A1 | 11/2004 | Brown | |
| 2006/0201931 A1 | 9/2006 | Lee et al. | |
| 2006/0220587 A1 | 10/2006 | Tobita et al. | |
| 2008/0173955 A1 * | 7/2008 | Kawasumi et al. | ........... 257/401 |
| 2008/0309633 A1 | 12/2008 | Hotelling et al. | |
| 2010/0157032 A1 | 6/2010 | Park et al. | |

(Continued)

FOREIGN PATENT DOCUMENTS

| | | |
|---|---|---|
| CN | 1848228 A | 10/2006 |
| CN | 101754041 A | 6/2010 |

(Continued)

OTHER PUBLICATIONS

Office Action dated Jun. 11, 2013 from the Japanese Patent Office in counterpart Japanese application No. 2011-280078.

(Continued)

*Primary Examiner* — Long D Pham
(74) *Attorney, Agent, or Firm* — Morgan, Lewis & Bockius LLP

(57) ABSTRACT

A display with integrated touch sensor and a driving method thereof are provided. The display comprises a display data driving circuit that supplies analog video data voltages to data lines of a display panel during a display period and maintains the voltage of the data lines at the same specific DC voltage during a touch sensor driving period; a display scan driving circuit that sequentially supplies scan pulses synchronized with the analog video data voltages to the gate lines of the display panel during the display period; a touch sensor driving circuit that sequentially supplies driving pulses to the Tx lines of the display panel during the touch sensor driving period; and a touch sensor readout circuit that receives a touch signal from the mutual capacitances via the Rx lines of the display panel during the touch sensor driving period.

8 Claims, 8 Drawing Sheets

(56) References Cited

U.S. PATENT DOCUMENTS

| | | |
|---|---|---|
| 2010/0316182 A1 | 12/2010 | Lai |
| 2011/0091006 A1* | 4/2011 | Liu et al. .......................... 377/68 |
| 2012/0019454 A1* | 1/2012 | Huang ........................... 345/173 |
| 2012/0038585 A1* | 2/2012 | Kim ............................... 345/174 |
| 2012/0044195 A1* | 2/2012 | Nakanishi et al. ............. 345/174 |
| 2012/0162089 A1* | 6/2012 | Chang ........................... 345/173 |

FOREIGN PATENT DOCUMENTS

| | | |
|---|---|---|
| EP | 0 742 531 A1 | 11/1996 |
| EP | 2 159 630 A1 | 3/2010 |
| EP | 2 224 277 A1 | 9/2010 |
| JP | 2010-277443 A | 12/2010 |
| TW | 200425041 | 11/2004 |
| TW | 201044363 | 12/2010 |

OTHER PUBLICATIONS

Communication dated Sep. 18, 2013 from the European Patent Office in counterpart European application No. 11184463.5.

Office Action dated Mar. 20, 2014 from the Taiwanese Advance Patent & Trademark Office in counterpart Taieanese application No. 100148915.

The Second Office Action dated Aug. 27, 2014 from The State Intellectual Property Office of the People's Republic of China in counterpart Chinese application No. 201110424097.5.

* cited by examiner

DISPLAY WITH INTEGRATED TOUCH SENSOR FOR DETECTING A TOUCH BY MUTUAL CAPACITANCE AND METHOD THEREOF

This application claims the benefit of Korea Patent Application No. 10-2011-0026915 field on Mar. 25, 2011, the entire contents of which is incorporated herein by reference for all purposes as if fully set forth herein.

BACKGROUND

1. Field

This document relates to a display with integrated touch sensor and a driving method thereof.

2. Related Art

With a recent trend toward thin profile and lightness in weight of electric home appliances or personal digital appliances, a button switch as user's input means has been substituted for a touch sensor. A touch screen applied in a display device comprises a plurality of touch sensors. The touch sensors may be integrated in an in-cell type within the display panel.

Capacitance type touch sensors can be implemented in a mutual capacitance type. The capacitance type touch sensors comprise mutual capacitance formed at intersections between signal lines Tx and Rx crossing each other as shown in FIG. 1a. When a finger reaches between electrodes of capacitance formed at the capacitance type touch sensors as shown in FIG. 1b, the electric field between the electrodes is cut off, to thus reduce the amount of charge of the mutual capacitance. Accordingly, the capacitance type touch sensors can recognize a touch by measuring a change in the amount of charge of the mutual capacitance before and after the touch.

When touch sensors are integrated in a display panel, the coupling between signal lines connected to the touch sensors and signal lines connected to the pixels of the display panel cause an electrical effect between the touch sensors. For example, the voltage of gate lines connected to the pixels swings at a relatively large swing width. This voltage is a noise component, which may reduce the sensitivity and touch recognition rate of the touch sensors and the touch recognition rate. Therefore, to reduce errors in the sensitivity and touch recognition rate of the touch sensors integrated in the display panel, noise effect applied to the touch sensors from the signal lines connected to the pixels have to be reduced.

SUMMARY

An aspect of this document is to provide a display with integrated touch sensor, which can minimize noise applied to touch sensors from signal lines connected to pixels of a display panel, and a driving method thereof.

A display with integrated touch sensor according to the present invention comprises: a display panel comprising data lines for supplying data voltages to the pixels, gate lines for supplying scan pulses to the pixels, and Tx lines and Rx lines crossing each other and having mutual capacitances formed at intersections thereof; a display data driving circuit that supplies analog video data voltages to the data lines during a display period and maintains the voltage of the data lines at the same specific DC voltage during a touch sensor driving period; a display scan driving circuit that sequentially supplies scan pulses synchronized with the analog video data voltages to the gate lines during the display period; a touch sensor driving circuit that sequentially supplies driving pulses to the Tx lines during the touch sensor driving period; and a touch sensor readout circuit that receives a touch signal from the mutual capacitances via the Rx lines during the touch sensor driving period.

The specific DC voltage is a ground voltage or a DC voltage similar to the ground voltage.

The display scan driving circuit maintains the voltage of the gate lines at the gate low voltage during the touch sensor driving period.

There is provided a method for driving a display with integrated touch sensor according to the present invention, the display comprising a display panel comprising data lines for supplying data voltages to the pixels, gate lines for supplying scan pulses to the pixels, and Tx lines and Rx lines crossing each other and having mutual capacitances formed at intersections thereof, the method comprising: supplying analog video data voltages to the data lines during a display period; sequentially supplying scan pulses synchronized with the analog video data voltages to the gate lines during the display period; sequentially supplying driving pulses to the Tx lines during the touch sensor driving period; and receiving a touch signal from the mutual capacitances via the Rx lines during the touch sensor driving period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1A:
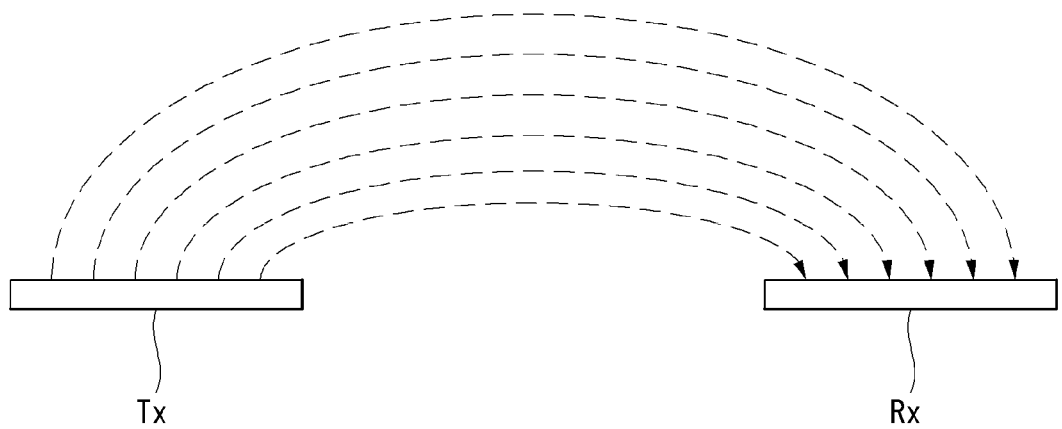
FIGS. 1a and 1b are views showing operations before and after a touch on capacitance type touch sensors.
Figure 1B:
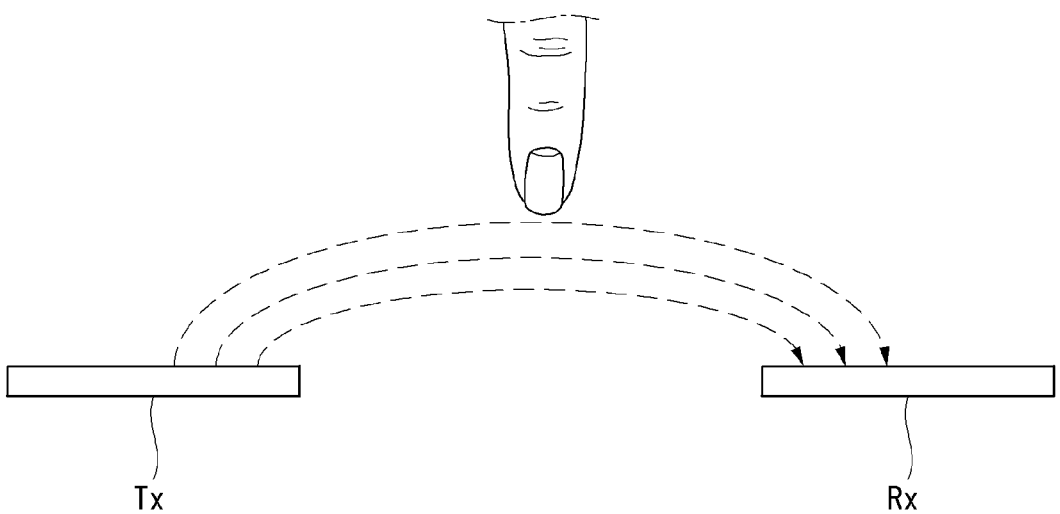

Hereinafter, an implementation of this document will be described in detail with reference to the attached drawings.

Throughout the specification, like reference numerals denote substantially like components. Hereinafter, the detailed description of related known functions or configurations that may unnecessarily obscure the subject matter of the present invention in describing the present invention will be omitted.

The display with integrated touch sensor of the present invention may be implemented as a flat panel display device, such as a liquid crystal display (LCD), a field emission display (FED), a plasma display panel (PDP), an organic light emitting display (OLED), or an electrophoresis (EPD), and touch sensors integrated in an in-cell type in the display panel of the flat panel display device. In an exemplary embodiment that follows, it should be noted that, although a liquid crystal display device will be described as an example of the flat panel display device, the display device of the present invention is not limited to the liquid crystal display device.

Figure 2:
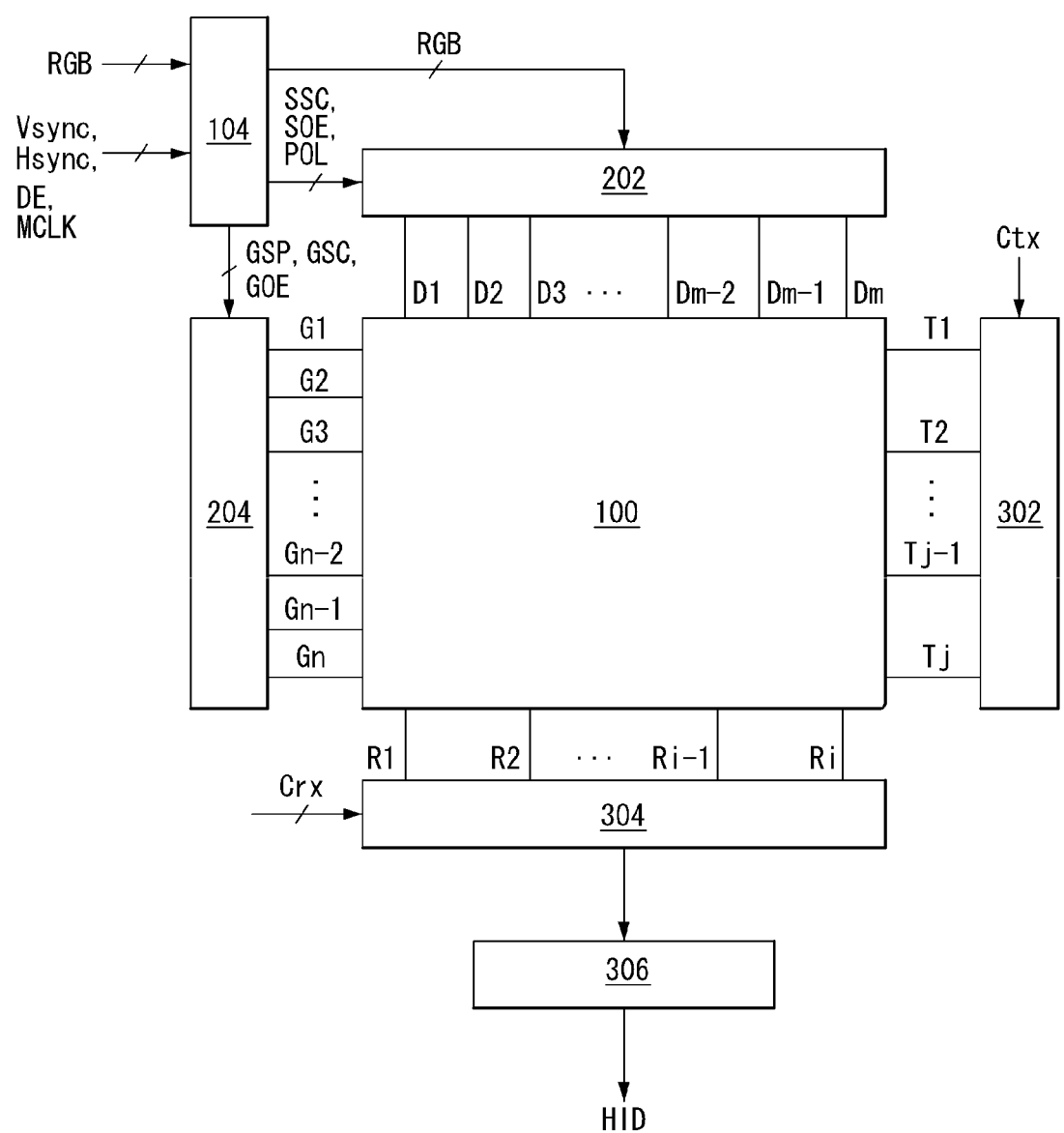
FIG. 2 is a block diagram showing a display with integrated touch sensor according to an exemplary embodiment of the present invention.
Figure 3:
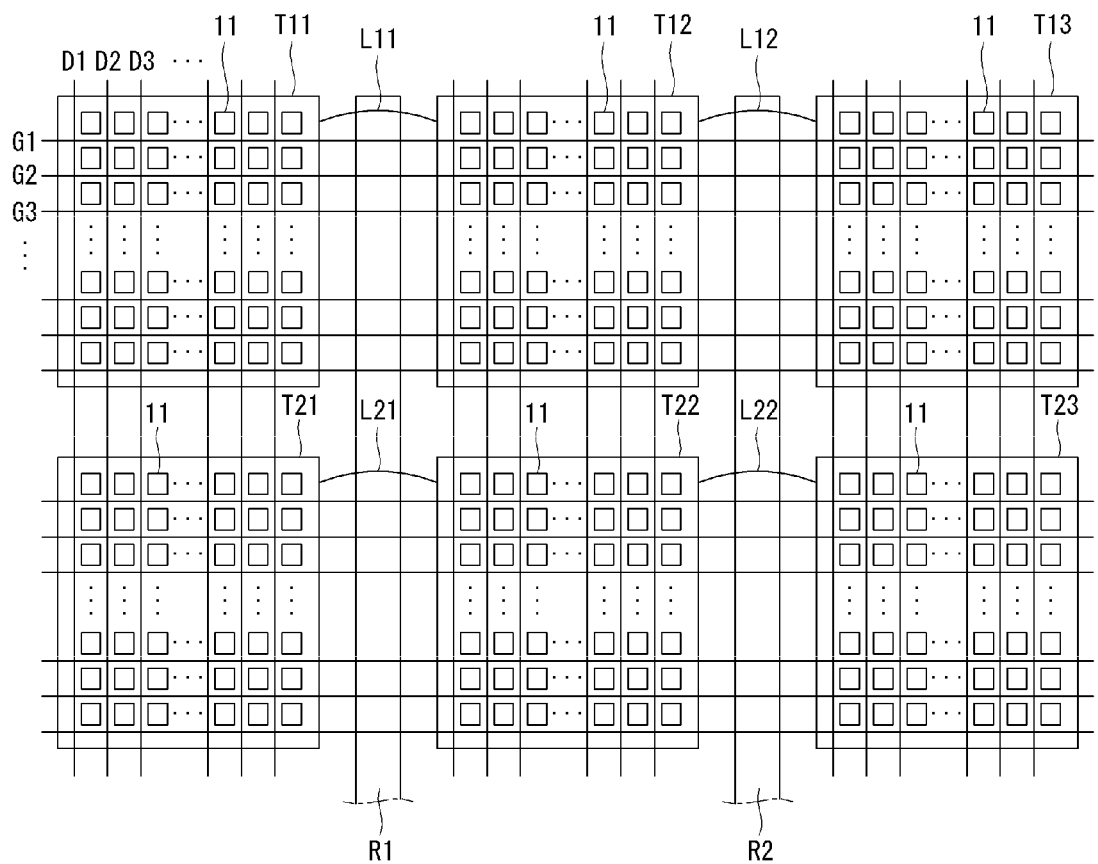
FIG. 3 is a plan view showing part of the pixel array and touch sensors integrated in the display panel shown in FIG. 2.

Referring to FIGS. 2 and 3, the display with integrated touch sensor according to an exemplary embodiment of the present invention comprises a display panel 100, a display data driving circuit 202, a display scan driving circuit 204, a touch sensor driving circuit 302, a touch sensor read-out circuit 304, a touch sensor driving circuit 304, a touch controller 306, and a timing controller 104.

The display panel 100 has a liquid crystal layer formed between two glass substrates. Formed on a lower glass substrate of the display panel 100 are a plurality of data lines D1 to Dm (m is a positive integer), a plurality of gate lines G1 to Gn (n is a positive integer) crossing the data lines D1 to Dm, a plurality of thin film transistors (TFTs of FIG. 6) formed at the crossings of the data lines D1 to Dm and the gate lines G1 to Gn, a plurality of pixel electrodes 11 for charging liquid crystal cells (Clc of FIG. 6) with a data voltage, a storage capacitor (Cst of FIG. 6) connected to the pixel electrodes 11, for maintaining a voltage of the liquid crystal cells, and touch sensors.

Figure 4:
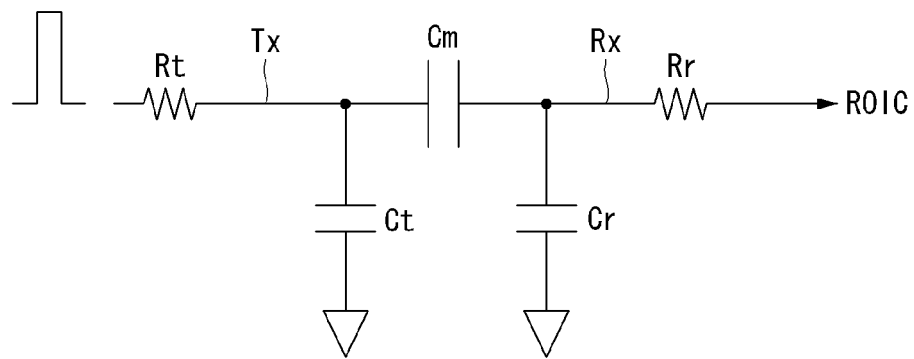
FIG. 4 is an equivalent circuit diagram showing an ideal touch sensor not coupled to signal lines connected to the pixels of the display panel.
Figure 5:
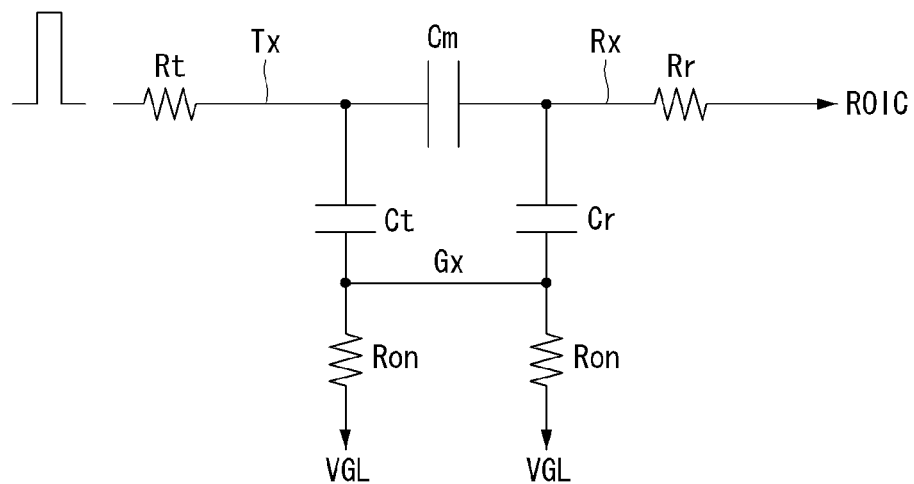
FIG. 5 is an equivalent circuit diagram showing a touch sensor coupled to signal lines connected to the pixels of the display panel.
Figure 6:
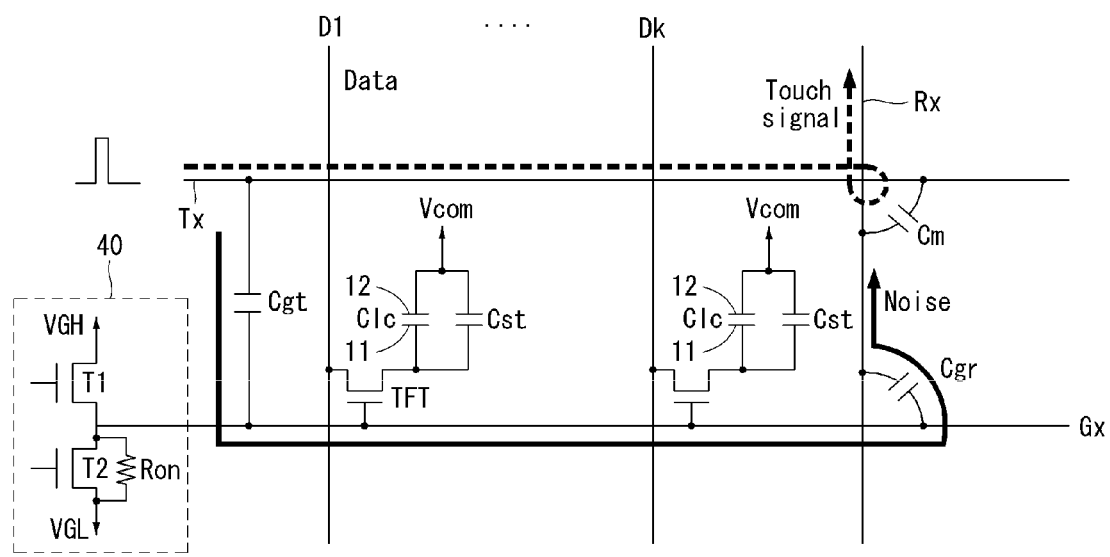
FIG. 6 is a circuit diagram showing a noise component flowing into the touch sensor via the signal lines connected to the pixels of the display panel.

As shown in FIGS. 4 to 6, the touch sensors comprise Tx lines T1 to Tj (j is a positive integer less than n) parallel to the gate lines G1 to Gn, Rx lines R1 to Ri (i is a positive integer less than m) crossing the Tx lines T1 to Tj, and parallel to the data lines D1 to Dm, and a mutual capacitance Cm formed at intersections between the TX lines T1 to Tj and the Rx lines R1 to Ri.

The Tx lines T1 to Tj and the Rx lines R1 to Ri are connected to a common electrode 12 to supply a common voltage Vcom to the common electrode 12 during a display period. During a touch sensor driving period, a driving pulse for driving the touch sensors is supplied to the Tx lines T1 to Tj, and a touch reference voltage Vref is supplied to the Rx lines R1 to Ri.

The pixels of the display panel 100 are formed in pixel areas defined by the data lines D1 to Dm and the gate lines G1 to Gn and arranged in a matrix format. The liquid crystal cell of each pixel is driven by an electric field applied according to a voltage difference between the data voltages applied to the pixel electrodes and the common voltage Vcom applied to the common electrode 12 to adjust the transmission amount of incident light. The TFTs are turned on in response to the gate pulses from the gate lines G1 to Gn to supply voltages from the data lines D1 to Dm to the pixel electrodes 11.

The upper glass substrate of the display panel 100 includes a black matrix, a color filter, and the like. The lower glass substrate of the display panel 100 may be implemented as a COT (Color Filter On TFT) structure. In this case, the black matrix and the color filter may be formed on the lower glass substrate of the display panel 100.

The common electrode 12 is formed on the upper glass substrate in a vertical electric field driving method such as a twisted nematic (TN) mode and a vertical alignment (VA) mode, and on the lower glass substrate along with the pixel electrode 11 in a horizontal electric field driving method such as an in plane switching (IPS) mode and a fringe field switching (FFS) mode. A common voltage Vcom supplied to the common voltage 12 may be a DC voltage of 7 V to 8 V. The common electrode 12 is connected to one or more of the Tx lines T1 to Tj and the Rx lines R1 to Ri to receive the common voltage Vcom through the Tx lines T1 to Tj and the Rx lines R1 to Ri.

A polarization plate is attached onto each of the upper glass substrate and the lower glass substrate of the display panel 100, and an alignment film for setting a pre-tilt angle of liquid crystal is formed on the inner surface being in contact with the liquid crystal. A color spacer for maintaining a cell gap of liquid crystal cells may be formed between the upper glass substrate and lower glass substrate of the display panel 100.

The display data driving circuit 202 comprises a plurality of source drive integrated circuits ICs. The source drive ICs output analog video data voltage during a predetermined display period, and outputs a specific DC voltage during a touch sensor driving period. The specific DC voltage is a voltage capable of minimizing a variation in the voltage charged in the mutual capacitance Cm of the touch sensors during the touch sensor driving period. The specific DC voltage may be round voltage GND or similar DC voltage. The source drive ICs latches digital video data RGB input from the timing controller 104. The source drive ICs convert the digital video data RGB into analog positive/negative gamma compensation voltages and output analog video data voltages. The analog video data voltages are supplied to the data lines D1 to Dm.

The display scan driving circuit 204 comprises one or more scan drive ICs. The scan drive ICs sequentially supply scan pulses (or gate pulses) synchronized with analog video data voltages to the gate lines G1 to Gn under control of the timing controller 104 during a display period and selects lines of the display panel to which the analog video data voltages are written. The scan pulses are generated as pulses that swing between a gate high voltage VGH and a gate low voltage VGL. The display scan driving circuit 204 continuously supplies the gate low voltage VGL to the gate lines G1 to Gn without generating scan pulses during the touch sensor driving period. Accordingly, the gate lines G1 to Gn supply gate pulses to the TFTs of the pixels during the display period to sequentially select lines to which data is written on the display panel 100, and maintains the gate low voltage VGL during a touch sensor driving period. The gate high voltage VGH may be a voltage of approximately 18 V to 20V, and the gate low voltage VGL may be a voltage of approximately 0 V to −15 V.

The touch sensor driving circuit 302 supplies the common voltage Vcom to the Tx lines T1 to Tj during the display period, and sequentially applies driving pulses to the Tx lines T1 to Tj during the touch sensor driving period to scan the touch sensors.

The touch sensor readout circuit 304 supplies the common voltage Vcom to the Rx lines R1 to Ri during the display period, and supplies the touch reference voltage Vref to the Rx lines R1 to Ri during the touch sensor driving period. The touch reference voltage Vref may be set to a DC voltage higher than 0 V and lower than 3 V. The touch sensor readout circuit 304 amplifies an analog output (voltage of mutual capacitance) of the touch sensors input through the Rx lines R1 to Ri, converts it into digital data of HID format, and transmits it into the touch controller 306.

The touch controller 306 analyzes digital data input from the touch sensor readout circuit 304 by a predetermined touch recognition algorithm to calculate coordinate values. Data of the coordinate values of a touch position output from the touch controller 306 is transmitted to an external host system. The host system executes an application indicated by the coordinate values of the touch position.

The timing controller 104 receives timing signals, such as a vertical synchronization signal Vsync, a horizontal synchronization signal Hsync, a data enable signal DE, and a main clock MCLK, and generates timing control signals for controlling the operation timings of the display data driving circuit 202 and the display scan driving circuit 204. The timing control signals of the display scan driving circuit 204 comprise a gate start pulse GSP, a gate shift clock GSC, a gate output enable GOE, and a shift direction control signal DIR. The timing control signals of the display data driving circuit 202 comprise a source sampling clock SSC, a polarity control signal POL, and a source output enable signal SOE.

The timing controller 104 generates timing control signals Ctx and Crx for controlling the operation timings of the touch sensor driving circuit 302 and the touch sensor readout circuit 304.

The timing controller 104 controls the timing control signals to time-divide 1 frame period into a display period and a touch sensor driving period. For example, if 1 frame period is 1/60 second (16.67 msec), the timing controller 104 sets the touch sensor driving period to 5.67 msec to drive the touch sensor driving circuit 302 and the touch sensor readout circuit 304 during the touch sensor driving period to detect a touch position of the touch screen. The display period and the touch sensor driving period may be properly adjusted by taking the panel characteristics into account according to the type of the display panel 100.

FIG. 3 is a plan view showing part of the pixel array and touch sensors integrated in the display panel 100 shown in FIG. 2.

In FIG. 3, the Tx lines T1 to Tj comprise transparent conductive block patterns T11 to T23 and link patterns L11 to L22.

Each of the transparent conductive block patterns T11 to T23 is patterned to be larger than each of the pixels. Each of the transparent conductive block patterns T1 to T23 overlaps with the pixels with an insulation layer therebetween, and may be patterned with a transparent conductive material such as indium tin oxide (ITO). The link pattern L11 to L22 electrically connects the transparent conductive block patterns T11 to T23 adjacent in a transverse direction (or horizontal direction) across the Rx lines R1 and R2. The link patterns L11 to L22 overlap with the Rx lines R1 and R2 with an insulating layer therebetween. The link patterns L11 to L22 may be patterned with metals having high electrical conductivity, such as aluminum Al, aluminum neodyminum (AlNd), molybdenum (Mo), chrome (Cr), copper (Cu), and silver (Ag), or patterned with a transparent conductive material. In FIG. 3, the first Tx line comprises a plurality of transparent conductive block patterns T11 to T13 connected along a transverse direction via the link patterns L11 and L12. The second Tx line comprises a plurality of transparent conductive block patterns.

The Rx lines R1 and R2 are longitudinally patterned along a lengthwise direction (or vertical direction) between the transparent conductive block patterns T11 to T23 adjacent in the transverse direction. The Rx lines R1 and R2 may be formed of a transparent conductive material such as ITO. Each of the RX lines R1 and R2 may overlap with a plurality of pixels not shown.

In FIG. 3, "D1~D3 . . . " denote data lines, and "G1~G3 . . . " denote gate lines.

FIG. 4 is an equivalent circuit diagram showing an ideal touch sensor not coupled to signal lines connected to the pixels of the display panel 100. FIG. 5 is an equivalent circuit diagram showing a touch sensor coupled to signal lines connected to the pixels of the display panel 100. FIG. 6 is a circuit diagram showing a noise component flowing into the touch sensor via the signal lines connected to the pixels of the display panel 100.

In FIGS. 4 to 6, "Ct" denotes the parasitic capacitance connected to the Tx line, "Cr" denotes the parasitic capacitance connected to the Rx line, "Cgr" denotes the parasitic capacitance between the gate line Gx and the Rx line, "Rt" denotes the capacitance of the Tx line, and "Rr" denotes the capacitance of the Rx line.

Under the ideal condition (FIG. 4) in which a capacitance type touch sensor is not coupled to the signal lines connected to the pixels, a change in mutual capacitance Cm formed at intersections between the Tx line and the Rx line before and after a touch can be detected without a noise. On the other hand, when the gate lines Gx connected to the pixels and the capacitance type touch sensor are coupled as shown in FIG. 5, a noise component current flows through the Tx line, the gate line Gx, the parasitic capacitance Cgr between the gate line Gx and the Rx line, and the current is mixed into a touch signal output through the Rx line. The touch signal is a voltage output from the mutual capacitance Cm. Due to this noise component, the voltage change of the mutual capacitance before and after a touch is decreased, so it is difficult to identify the presence of a touch, thus reducing touch sensitivity. When the noise component is discharged through a resistance Ron connected to the gate line Gx, the noise component mixed into the touch signal can be reduced. Therefore, the resistance Ron connected to the gate line Gx is reduced, the noise component mixed into the touch signal also can be reduced.

In FIG. 6, reference numeral "40" denotes an output unit of the display scan driving circuit 204. The output unit 40 of the display scan driving circuit 204 comprises a pull-up transistor T1 for supplying a gate high voltage VGH to the gate line Gx and a pull-down transistor T2 for supplying a gate low voltage VGL to the gate line Gx.

As shown in FIG. 6, the resistance Ron connected to the gate line Gx during the touch sensor driving period comprises a source-drain resistance of the pull-down transistor T2 formed at the output unit 40 of the display scan driving circuit 204. Therefore, the size of the pull-down transistor T2 has to be increased in order to reduce the resistance Ron connected to the gate line Gx.

The display scan driving circuit 204 can be mounted in a gate in panel (GIP) type directly in the lower glass substrate of the display panel 100. In this case, the TFTs of the pixel array and the transistors of the display scan driving circuit 204 may be formed on amorphous silicon (a-Si). The resistance Ron of the amorphous silicon-based transistors is much higher than the resistance of the transistors formed on a low temperature polysilicon (LTPS)-based display panel. Accordingly, the size of the transistors should be increased in order to sufficiently decrease the resistance Ron of the amorphous silicon-based transistors. If the size of the pull-down transistor T2 of the display scan driving circuit 204 is increased, a bezel area, which is a non-display area, becomes larger, thus making it difficult to implement the display panel 100 as a narrow bezel panel.

Figure 7:
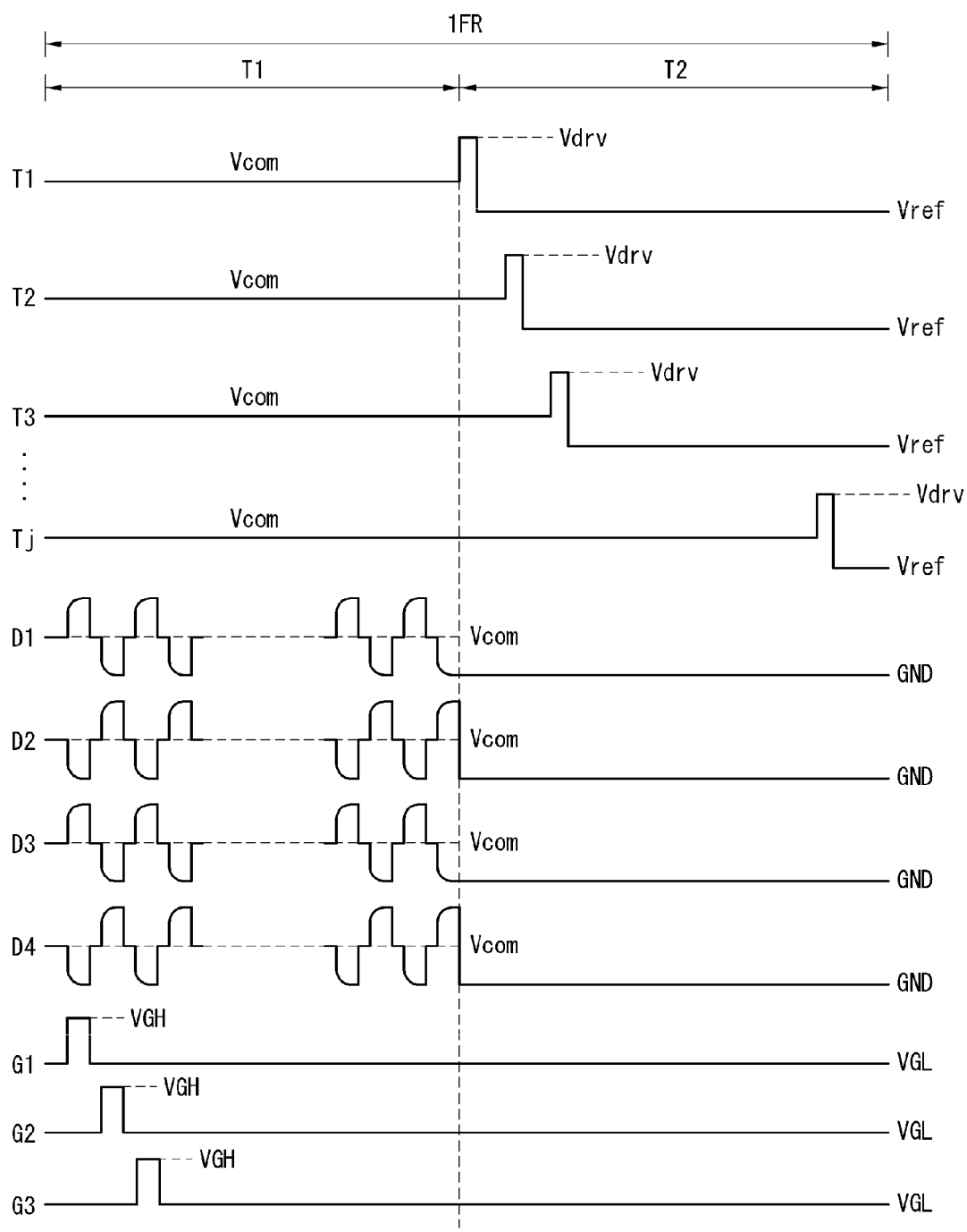
FIG. 7 is a waveform diagram showing driving signals of a display with integrated touch sensor according to an exemplary embodiment of the present invention.

FIG. 7 is a waveform diagram showing driving signals of a display with integrated touch sensor according to an exemplary embodiment of the present invention.

Referring to FIG. 7, the display with integrated touch sensor according to the exemplary embodiment of the present invention time-divides 1 frame period into a display period T1 and a touch sensor driving period T2 to drive a display panel 100 in which touch sensors are integrated.

During the display period T1, positive/negative analog video data voltages are supplied to the data lines D1 to D4, and gate pulses synchronized with the data voltages are supplied to the gate lines G1 to G3. A common voltage Vcom to be supplied to the common electrode 12 during the display period T1 is supplied to the Tx lines T1 to Tj and the Rx lines R1 to Ri.

Figure 8:
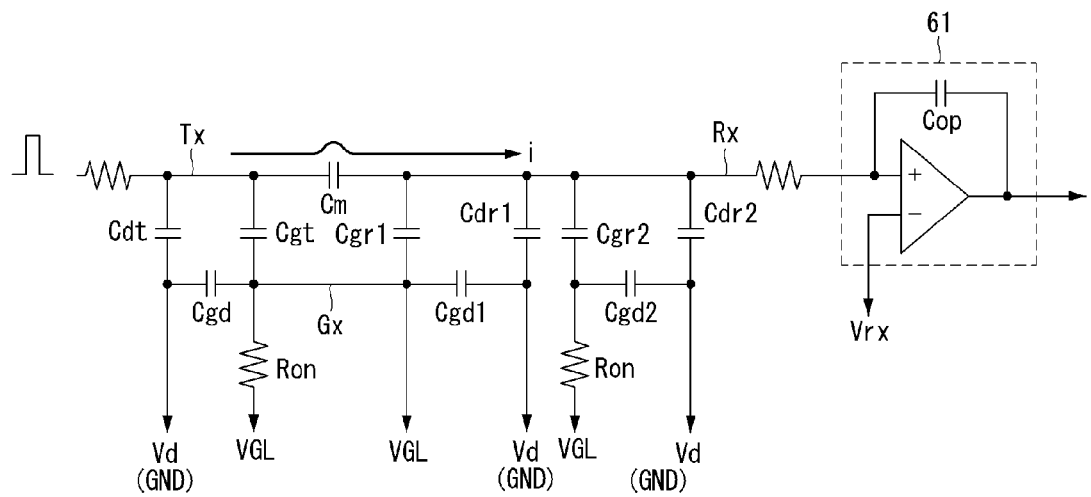
FIG. 8 is a circuit diagram showing the flow of a touch signal that receives little effect from a noise component when the same specific DC voltage is supplied to the data lines.

During the touch sensor driving period T2, a specific DC voltage, for example, a ground voltage GND, is supplied to the data lines D1 to D4, and a gate low voltage VGL is supplied to the gate lines G1 to G3. Driving pulses are sequentially supplied to the TX lines T1 to Tj during the touch sensor driving period T2. A touch reference voltage Vref is supplied to the Rx lines R1 to Ri during the touch sensor driving period T2. During the touch sensor driving period T2, when the same specific DC voltage is supplied to all the data lines D1 to D4 as shown in FIG. 7, the noise component mixed into a touch signal through signal lines connected to the pixels can be minimized as shown in FIG. 8. Meanwhile, as in the conventional display with integrated touch sensor, the source drive ICs of the display data driving circuit 202 maintain the last positive/negative data voltage during the touch sensor driving period T2, and then output a new positive/negative data voltage in the display period T1 of the next frame period. For example, in the conventional display with integrated touch sensor, the first data line D1 maintains a negative data voltage, which is the last data voltage of the display period T2, during the touch sensor driving period T2.

In FIG. 7, the voltage of the driving pulses supplied to the Tx lines T1 to Tj during the touch sensor driving period is a voltage between 2 V and 18 V, which may vary according to the IC driving characteristics of the touch sensor driving circuit 302.

During the touch sensor driving period, a touch reference voltage Vref supplied to the Rx lines R1 to Ri is applied. In the present invention, referring to FIGS. 4 to 7, the driving pulses are applied to the Tx lines T1 to Tj, and the presence of a touch is detected based on a change in the charge of the RX lines R1 to Ri. When a predetermined touch reference voltage Vref is applied to the Rx lines R1 to Ri, the amount of charge of the mutual capacitance Cm changes due to the pulsing of the Tx lines T1 to Tj, and the amount of charge of the Rx lines R1 to Ri is shifted in proportion to a variation of the amount of charge of the mutual capacitance Cm. A shift in the charge of the Rx lines R1 to Ri is changed again into a touch reference voltage Vref. In this process, changes in the RX lines R1 to Ri can be sensed.

When the amount of charge of the mutual capacitance Cm is varied due to a touch, a slight change in waveform occurs. Integration of this change is shown as a change in charge. In this case, if a touch reference voltage Vref has been applied to the Rx lines R1 to Ri, the Rx lines R1 to Rj are charged with the touch reference voltage Vref before a driving pulse is applied to the Tx lines T1 to Tj. When the voltage of the Tx lines T1 to Tj swings by the pulsing of the TX lines T1 to Tj, the amount of charge of the Rx lines R1 to Ri changes. When the potential of the Rx lines R1 to Ri is stabilized again at the touch reference voltage Vref, the charge of the Rx lines R1 to Ri is restored to the state before the application of the driving pulse. Then, a change in the amount of charge of the RX lines R1 to Ri can be detected as a change in the amount of charge induced by a change in the mutual capacitance Cm. In this manner, when a touch reference voltage Vref set as a constant DC voltage to the Rx lines R1 to Ri is applied during the touch sensing period, a change in the mutual capacitance Cm can be detected with little effect on variations in the charge of the parasitic capacitance connected to the Rx lines R1 to Ri.

In FIG. 8, "Cdt" denotes the parasitic capacitance between the data line and the Tx line, "Cgd, Cgd1, Cgd2" denote the parasitic capacitance between the gate lines Gx and the data lines, "Cgt" denote the parasitic capacitance between the gate line Gx and the Tx line, "Cgr1" denote the parasitic capacitance between the gate line and the Rx line, and "Cdr1, Cdr2" denote the parasitic capacitance between the data lines and the Rx line. Reference numeral "61" denotes an amplification circuit incorporated in a touch sensor readout circuit 304. The amplification circuit 61 comprises an operation amplifier (OP amp.) and a capacitor Cop. A touch signal is input to a non-reverse input terminal of the operation amplifier via the Rx line, and a reference voltage Vrx is supplied to a reverse input terminal of the operation amplifier. The reference voltage Vrx may be set as a touch reference voltage Vref. The capacitor Cop is connected between the non-inverse input terminal of the operation amplifier and an output terminal of the operation amplifier to accumulate and store a touch signal.

The mutual capacitance Cm of a touch sensor that has detected a touch is connected to the signal lines connected to the pixels through the parasitic capacitances Cdt, Cgd, Cgt, Cgr1, Cgd1, and Cdr1. During the touch sensor driving period T2, a ground voltage VND or similar specific DC voltage is supplied to the data lines, and a gate low voltage VGL is supplied to the gate lines Gx. Therefore, there is no variation in the parasitic capacitances Cdt, Cgd, Cgt, Cgr1, Cgd1, and Cdr1. In particular, as a ground voltage VND or similar specific DC voltage is supplied to the data lines, a noise component signal flowing through the data lines and gate lines connected to the pixels does not flow to the Rx lines, but is discharged via the data lines. Accordingly, the noise component is hardly mixed into the touch signal output from the mutual capacitance Cm and transferred to the touch sensor read out circuit 304 via the RX lines. Thus, a change in the touch signal before and after the touch can be increased, thereby improving touch sensitivity and touch recognition rate.

In another exemplary embodiment of the present invention, a specific DC voltage is supplied to the data lines during the touch sensor driving period T2, and the pull-down transistor resistance Ron of the display scan driving circuit 204 connected to the gate lines is designed to be small. In one example where the scan driving circuit 204 is formed in a GIP type directly in the amorphous silicon-based display panel 100, the pull-down transistor resistance Ron of the scan driving circuit 204 is designed to be about 10 kΩ to 150 kΩ. In this case, the bezel area can be increased, but the noise component signal that can be mixed into a touch signal can be effectively discharged through the data lines and the gate lines.

In another example where the scan driving circuit 204 is manufactured in a Tape Automated Bonding (TAB) IC format and bonded onto the substrate of the display panel 100, the pull-down transistor resistance Ron of the scan driving circuit 204 can be deigned to be greater than 0 kΩ and less than 2 kΩ.

Figure 9:
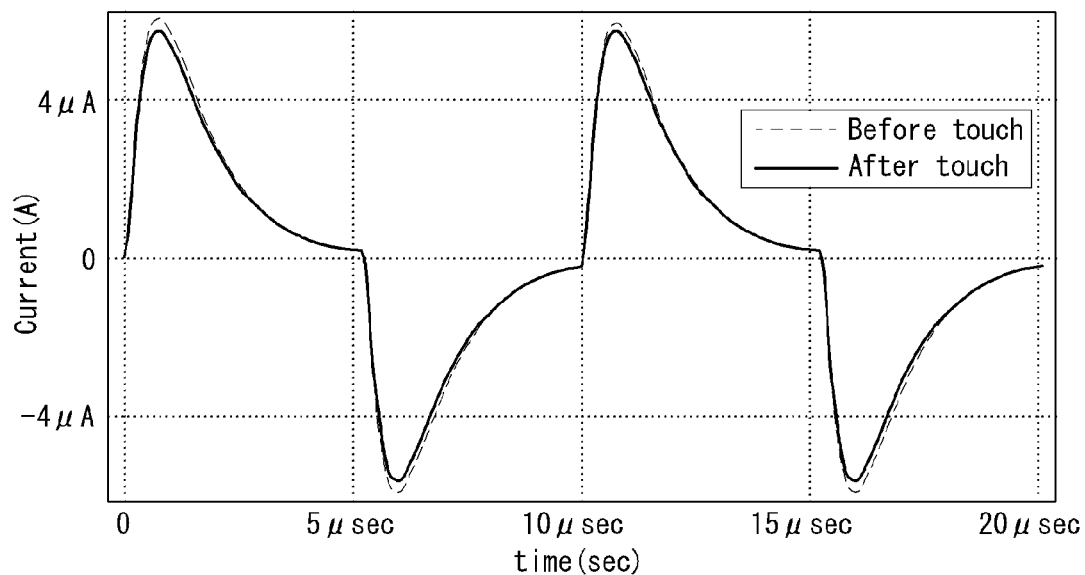
FIG. 9 is a view of a test result showing current changes of the Rx lines as shown in FIG. 4.
Figure 10:
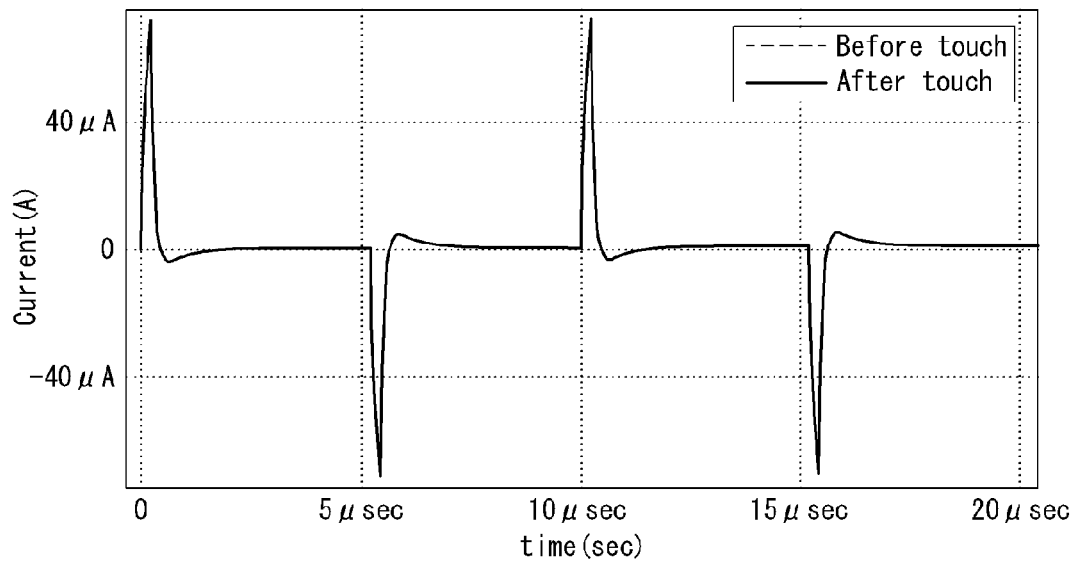
FIG. 10 is a view of a test result showing current changes of the Rx lines before and after a touch on an LIPS-based display panel.

FIG. 9 is a view of a test result showing current changes of the Rx lines as shown in FIG. 4. FIG. 10 is a view of a test result showing current changes of the Rx lines before and after a touch on an LTPS-based display panel.

FIG. 10 is a view of a test result showing current changes before and after a touch on a touch sensor integrated in an LTPS-based display panel. The pull-down transistor resistance Ron of the scan driving circuit 204 formed on the LTPS-based display panel is about 1/10 of the pull-down transistor resistance Ron of the scan driving circuit 204 formed on the amorphous silicon-based display panel 100. As can be seen in the test result of FIG. 10, the current measured in the Rx lines on the LTPS-based display panel ranges between 70 µA to 80 µA, thereby increasing power consumption. In general, the IC of the touch sensor readout circuit 304 can supply current less than 10 µA to the Rx lines R1 to Ri, and sense a current change of less than 10 µA. When a specific DC voltage is supplied to the data lines during the touch sensor driving period, the current flowing through the Rx lines can be reduced to less than 10 µA.

Figure 11:
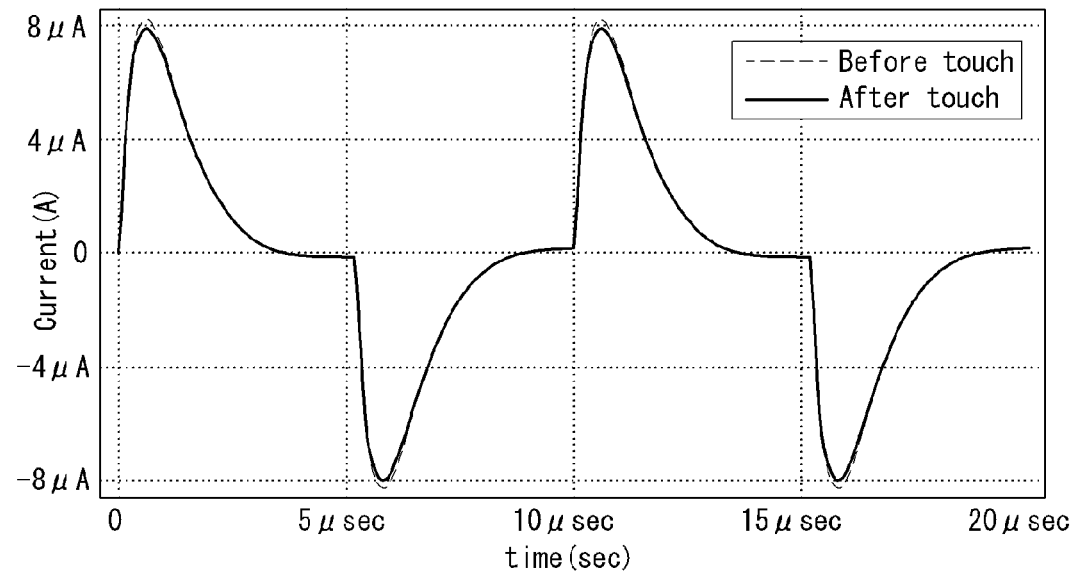
FIG. 11 is a view showing current changes of the Rx lines before and after a touch on a touch sensor of a display with integrated touch sensor according to an exemplary embodiment of the present invention.

FIG. 11 is a view showing current changes of the Rx lines before and after a touch on a touch sensor of a display with integrated touch sensor according to an exemplary embodiment of the present invention. As can be seen in FIG. 11, when the voltage of the data lines is maintained at a specific DC voltage during the touch sensor driving period T2, a touch signal difference between before and after a touch on the touch sensor appears even if the pull-down transistor resistance Ron of the scan driving circuit 204 is relatively higher compared to the LIPS-based display panel 100. Thus, it is confirmed that the output of the touch sensor receives little effect from the signal lines connected to the pixels.

The present invention is applicable to a display having an amorphous silicon-based or LIPS-based display panel 100.

As described above, a noise component signal that can give adverse effect on the output of the touch sensor is discharged through the data lines by supplying a specific DC voltage to the data lines during the touch sensor driving period. As a result, the present invention can minimize noise applied to the touch sensors from the signal lines connected to the pixels of the display panel. Further, the present invention can minimize noise that can give adverse effect on the touch sensors without an increase in the bezel area on the amorphous silicon-based display panel.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display with integrated touch sensor, comprising:
    a display panel comprising a common electrode, a plurality of pixels each configured to provide an electric field in cooperation with the common electrode, data lines for supplying data voltages to the pixels, gate lines for supplying scan pulses to the pixels, and Tx lines and Rx lines crossing each other and having mutual capacitances formed at intersections thereof, the common electrode, the plurality of pixels, the data lines, the gate lines, the Tx lines and the Rx lines being disposed on a same substrate;
    a display data driving circuit that supplies analog video data voltages to the data lines during a display period and maintains the voltage of the data lines at a same specific DC voltage during a touch sensor driving period;
    a display scan driving circuit that sequentially supplies scan pulses synchronized with the analog video data voltages to the gate lines during the display period;
    a touch sensor driving circuit that sequentially supplies driving pulses to the Tx lines during the touch sensor driving period; and
    a touch sensor readout circuit that receives a touch signal from the mutual capacitances via the Rx lines during the touch sensor driving period,
    wherein the common electrode receives a common voltage through the Tx lines and the Rx lines during the display period,
    wherein an output end of the display scan driving circuit comprises pull-down transistors connected to the gate lines, and
    the source-drain resistance of each of the pull-down transistors is a value between 10 kΩ to 150 kΩ.

2. The display with integrated touch sensor of claim 1, wherein the specific DC voltage is a ground voltage or a DC voltage similar to the ground voltage.

3. The display with integrated touch sensor of claim 1, wherein the scan pulses swing between a gate high voltage and a gate low voltage, and
    the display scan driving circuit maintains the voltage of the gate lines at the gate low voltage during the touch sensor driving period.

4. The display with integrated touch sensor of claim 1, wherein an output end of the display scan driving circuit comprises pull-down transistors connected to the gate lines, and
    the source-drain resistance of each of the pull-down transistors is greater than 0 kΩ and less than 2 kΩ.

5. A method for driving a display with integrated touch sensor comprising a display panel comprising a common electrode having, a plurality of pixels each configured to provide an electric field in cooperation with the common electrode, data lines for supplying data voltages to the pixels, gate lines for supplying scan pulses to the pixels, and Tx lines and Rx lines crossing each other, and having mutual capacitances formed at intersections thereof, the method comprising, the common electrode, the plurality of pixels, the data lines, the gate lines, the Tx lines and the Rx lines being disposed on a same substrate:
    supplying analog video data voltages to the data lines and supplying a common voltage to the common electrode through the Tx lines and the Rx lines during a display period;
    sequentially supplying scan pulses synchronized with the analog video data voltages to the gate lines during the display period;
    sequentially supplying driving pulses to the Tx lines during the touch sensor driving period and maintaining a voltage of the data lines at the same specific DC voltage during the touch sensor driving period; and
    receiving a touch signal from the mutual capacitances via the Rx lines during the touch sensor driving period,
    wherein an output end of the display scan driving circuit comprises pull-down transistors connected to the gate lines, and
    the source-drain resistance of each of the pull-down transistors is a value between 10 kΩ to 150 kΩ.

6. The method of claim 5, wherein the specific DC voltage is a ground voltage or a DC voltage similar to the GND voltage.

7. The method of claim 5, further comprising maintaining the voltage of the gate lines at the gate low voltage during the touch sensor driving period,
    wherein the scan pulse swings between a gate high voltage and a gate low voltage.

8. The method of claim 5, wherein an output end of the display scan driving circuit comprises pull-down transistors connected to the gate lines, and
the source-drain resistance of each of the pull-down transistors is greater than 0 kΩ and less than 2 kΩ.

* * * * *